Oct. 1, 1963

F. DAVID 3,105,875

SOLID-STATE BINARY CODE MULTIPLEXING AND DEMULTIPLEXING DEVICE

Filed Dec. 9, 1957

2 Sheets-Sheet 1

INVENTOR.
FREDDY DAVID

BY Richard G. Stahr
ATTORNEY

United States Patent Office 3,105,875
Patented Oct. 1, 1963

3,105,875
SOLID-STATE BINARY CODE MULTIPLEXING AND DEMULTIPLEXING DEVICE

Freddy David, Henrietta, N.Y., assignor to General Dynamics Corporation, Rochester, N.Y., a corporation of Delaware Filed Dec. 9, 1957, Ser. No. 701,569
8 Claims. (Cl. 178—50)

The present invention relates to a binary code multiplexing and demultiplexing device and, more particularly, to a binary code multiplexing and demultiplexing device employing only solid state components.

In the past, the bits of a binary code have been time position multiplexed and demultiplexed by devices which employed a series of diodes. These devices have proved objectionable in that they require a multitude of diodes, with the accompanying maintenance problems, and also erase or destroy the information in the event of a power failure.

In a copending application, Serial Number 701,445, dated December 9, 1957, now Patent No. 3,105,874, a multiplexing and demultiplexing device employing only solid-state components is shown and described. The present invention relates to an improved solid-state multiplexing and demultiplexing device.

It is an object of this invention to provide a multiplexing and demultiplexing device which will obviate the disadvantages of the prior art.

It is another object of this invention to provide an improved multiplexing device employing only solid-state components.

It is another object of this invention to provide an improved demultiplexing device using only solid-state components.

It is another object of this invention to provide an improved device using only solid-state components which may be used for multiplexing or for demultiplexing binary signals.

In accordance with the improvement of this invention, a device which may be employed to time position multiplex the bits of a binary code from a plurality of signal sources, each of which is assigned a time position, or to demultiplex the bits of a binary code which have been time position multiplexed is provided wherein a magnetic core matrix has a coil individually coupled to each member thereof which serve as individual input coils when the device is being employed as a multiplexer and as individual output coils in which demultiplexed binary bits appear when the device is being employed as a demultiplexer, a common coil which is coupled to all of the members of the matrix which serves as a single output coil common to all of the members in which multiplexed binary bits appear as a pulse or the absence of a pulse at each time position for an input binary bit of one polarity or of another polarity, respectively, and another common coil individually coupled to all of the members of the matrix which serves as a switching coil when the device is being used as a multiplexer and as a common input coil when the device is being used as a demultiplexer.

For a better understanding of the present invention, together with further objects and advantages, reference is made to the following description and accompanying drawings in which.

By making maximum use of the ability of magnetic cores to "and" and "or" together two or more independent inputs, an extremely unique and economical multiplexing or demultiplexing device is provided by this invention.

Figure 1:
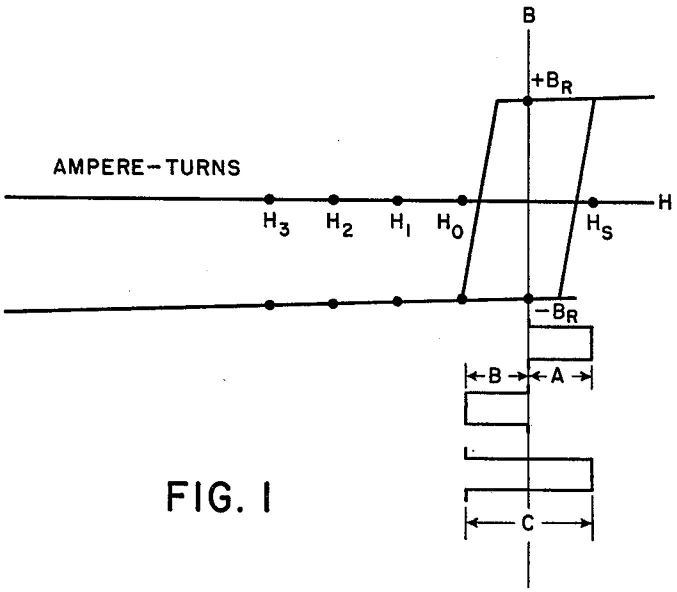
FIGURE 1 is the ideal square hysteresis loop characteristic of the magnetic members employed in this device.

In FIGURE 1, there is shown the ideal square hysteresis loop characteristic of the magnetic members as used with this device. With the member in its normal state or first condition of saturation, the operating point is at $-B_r$. Upon the energization of a coil which is coupled to the member through one or more coupling winding turns by a current pulse of a polarity and amplitude to produce "A" ampere-turns, the condition of saturation of the member is reversed to its alternate or second condition of saturation, shifting the operating point to $+B_r$. The energization of the same coil or another coil which is coupled to the member through one or more coupling winding turns by a current pulse of a polarity and amplitude to produce "B" ampere-turns will now reverse the condition of saturation to its normal or first condition and return the operating point to $-B_r$. With the member in its normal or first condition of saturation and the operating point at $-B_r$, the energization of a coil, coupled to the member through one or more coupling winding turns, by a current pulse of a polarity and magnitude to produce "B" ampere-turns will now transfer the operating point to $H_0$. From this operating point, therefore, the energization of a coil, coupled to the member through a coupling winding of one or more turns, by a current pulse of a polarity and amplitude to produce "C" ampere-turns is required to reverse the condition of saturation of the member. As the condition of saturation of the member is reversed from either condition of saturation to the other, a pulse may be sensed in an output coil coupled thereto. This characteristic of alternate magnetic saturation in either one of two conditions by current pulses of opposite polarity energizing one or more coils coupled to the members by one or more coupling winding turns, with the production of an output pulse as the condition of saturation is reversed, is employed in the device of this invention in a manner to be hereinafter described.

Figure 2:
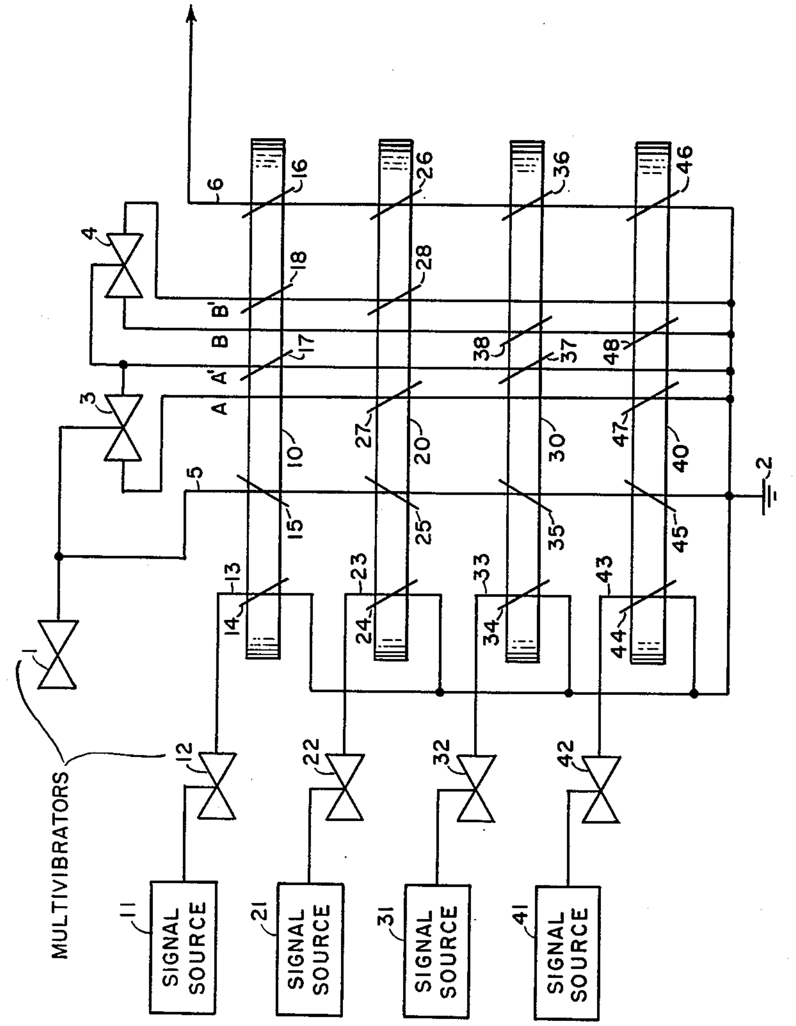
FIGURE 2 is a preferred embodiment of the device.

Referring to FIGURE 2 of the drawing, a plurality of magnetic members, shown at 10, 20, 30 and 40, comprise a magnetic core matrix. While these members may be of any desirable form, a toroidal shape is preferred and, in the interest of drawing simplicity, have been shown schematically as elongated rectangles.

As has been brought out before hereinabove, each of the members of this matrix may be magnetically saturated in either one of two conditions of saturation through the energization of coils coupled thereto. For purposes of this specification, the first and second conditions of saturation of the members will be referred to as the "P" and "N" conditions of saturation, respectively. In the interest of drawing simplification, the windings which couple the various coils to the members have been indicated as short, straight, diagonal lines which form an acute angle with the members, the direction of the acute angle denoting "P" or "N" sense windings. An acute angle to the left indicates an "N" sense winding while an acute angle to the right indicates a "P" sense winding. For purposes of clearly illustrating the magnetic characteristics of the members used in the device of this invention, it has hereinbefore been explained that to reverse the condition of saturation of the members requires energizing current pulses of opposite polarity. It should be noted at this time that the actual polarity of the energizing current pulses is significant only to the extent that the polarity be known in that energizing current pulses of the same polarity may produce either the "P" or the "N" condition of saturation depending upon the physical direction of the coupling winding turns which they energize. It is of utmost importance, however, that for energizing current pulses of either polarity, the physical direction of the coupling winding turns which they energize be such as to produce the "P" condition or the "N" condition of saturation, whichever may be required, as determined by the application. For this reason, then, the representative diagonal lines indicate only the sense of the coupling winding turns for producing either the "P" or the "N" condition of saturation in respect to the polarity of their energizing current pulses but do not necessarily indicate the physical direction of the coupling winding turns.

Also for purposes of drawing clarity and simplicity, the various coils herein referred to have been indicated as straight, vertical lines, each of which intersects one or more of the diagonal coupling coil representative lines and are comprised of the associated coupling windings connected in series.

When the device of this invention is employed as a time position multiplexer, coils 13, 23, 33 and 43 and their associated coupling windings 14, 24, 34 and 44 serve as input circuits each of which is individual to one of the members of the magnetic core matrix, while coil 6 and its associated coupling windings 16, 26, 36 and 46 serves as a common output circuit in which the time position multiplex signals appear as a pulse or the absence of a pulse at each time position for an input binary bit of one polarity or of another polarity, respectively, in a manner which will now be explained.

A number of binary signal sources are shown at 11, 21, 31 and 41. As these signal sources form no part of the invention and may be of any arrangement from which binary code signals may emanate, they have been here shown in block form. Each of these signal sources is assigned a time position and a member in the magnetic core matrix of the device of this invention. In this instance, then, four time positions and four members are required.

To clarify and simplify the description of the operation of the device of this invention, and in no way intending or inferring that it be limited thereto, it will be assumed that signal sources 11, 21, 31 and 41 are assigned magnetic members 10, 20, 30 and 40 and time positions 1, 2, 3 and 4, respectively, "mark" binary bits will appear in the common output coil 6 as a pulse, "space" binary bits will appear in the common output coil 6 as the absence of a pulse and that all of the members are initially in their "N" condition of saturation at operating point $-B_r$, FIGURE 1.

A source of time position and switching pulses, which per se forms no part of this invention but which may be any suitable pulse source, is indicated in block form at reference numeral 1. For purposes of explanation only, this source will be assumed to be a free-running multivibrator which produces a switching current pulse at each time position at a substantially constant rate.

In accordance with the present invention which is an improvement of the invention shown in the copending application hereinbefore referred to, a switching coil 5 is connected to the output of pulse source 1 and is coupled to each of the magnetic members 10, 20, 30 and 40 by respective coupling windings 15, 25, 35 and 45. The other side of switching coil 5 may be connected to point of reference 2, as shown. As the representative lines of coupling windings 15, 25, 35 and 45 form acute angles to the right, they are "P" sense windings, which, when energized by a switching pulse of a magnitude to produce "A" ampere-turns, will simultaneously reverse the condition of saturation of all of the members which are in their "N" condition of saturation at operating point $-B_r$, FIGURE 1.

To time position multiplex the bits of a binary code, however, it is mandatory that each member have its condition of saturation reversed only at the time position assigned the signal source associated therewith and, in accordance with the assumption hereinabove set forth, only for a "mark" bit from that source. Therefore, additional inhibiting coils must be coupled to each of the respective members, in an opposite sense relation to the switching coil coupling windings, which, when energized by current pulses, will prevent a reversal of the condition of saturation of all of the members except one at all time positions, a different member being accepted at each time position. A current pulse of a magnitude which will produce "B" ampere-turns, FIGURE 1, energizing one inhibiting coil will transfer the operating point of the member to which it is coupled to point $H_0$, FIGURE 1, while two current pulses, each of a magnitude which will produce "B" ampere-turns, FIGURE 1, each energizing a respective one inhibiting coil simultaneously, will transfer the operating point of the member to which they are coupled to point $H_1$, FIGURE 1. In either event, a switching pulse of a magnitude which will produce "A" ampere-turns, FIGURE 1, energizing switching coil 5 coupled to the member is of insufficient magnitude to reverse the condition of saturation of the member. Therefore, so that the switching pulses may reverse the condition of saturation of any of the members in the presence of a "mark" bit at the one time position assigned to the signal source associated therewith, the respective inhibiting coupling windings must both be unenergized at that time position.

Figure 3:
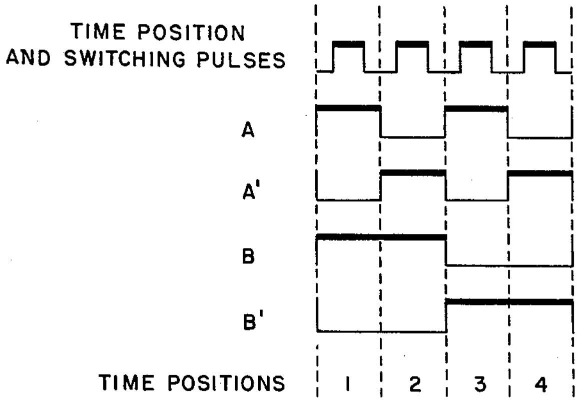
FIGURE 3 is a graphic illustration of current relations at each time position in certain coils of the device.

To produce these pulses, hereinafter referred to as inhibiting pulses, which energize the additional inhibiting coils, two bistable multivibrators, shown at 3 and 4, which are coupled as a binary divider are used. As these multivibrators, per se, form no part of the invention but are old and well known in the art, they have been here illustrated in block form. Multivibrator 3 is controlled by the pulses produced by time position and switching pulse source 1, while multivibrator 4 is under the control of multivibrator 3, as shown. The inhibiting coils which are connected to the output of each side of the respective bistable multivibrators are labeled "A" and "A′" and multivibrator 3 and "B" and "B′" for multivibrator 4. As the left side of each multivibrator 3 and 4 is conducting, an energizing current flows through coils A and B, respectively, and, as the right side of each multivibrator is conducting, an energizing current flows through coils A′ and B′, respectively. In each instance, therefore, as an energizing current flows in either coil of each coil pair, there is no energizing current in the other coil of the same coil pair. As time position and switching pulse multivibrator 1 produces output pulses, the right and left sides of multivibrator 3 are alternately triggered to conduction with each pulse, thereby producing an energizing current in coil A with the first, third, fifth, etc., pulse of time position and switching pulse source multivibrator 1 and an energizing current in coil A′ with the second, fourth, sixth, etc., pulse of time position and switching pulse source 1. Each time the right side of multivibrator 3 is extinguished, an output pulse is produced which triggers multivibrator 4. Therefore, an energizing current is produced in coil B with the first and second pulses of time position and switching pulse source multivibrator 1 and in coil B′ with the third and fourth pulses of time position and switching pulse source multivibrator 1. As these multivibrators are being switched at a relatively rapid rate, the respective energizing currents appear in coils A, A′, B and B′ as pulses which will be hereinafter identified by the coils which they energize. In this manner, then, multivibrators 3 and 4 produce what may best be described as two alternating pulse pairs, A and A′ and B and B′, the pulse frequency of each succeeding pair, B and B′, being half that of the preceding pair, A and A′. FIGURE 3 graphically illustrates the energizing current relations in each of the coils A, A′, B and B′ at each of the four time positions.

From the two alternating pulse pairs there are available four different combinations of one current pulse from each pair, A and B, A′ and B, A and B′ and A′ and B′. Referring to FIGURE 3, it may be noted that all of the inhibiting coils of each combination, in this instance two, are unenergized at a time position different than all other combinations. Only coils A′ and B′ are unenergized at time position 1, only coils A and B′ are unenergized at time position 2, only coils A′ and B are unenergized at time position 3, only coils A and B are unenergized at time position 4 and that at no other time position are both coils of each combination unenergized.

In accordance with the assumption outlined above, that the signal sources 11, 21, 31 and 41 associated with magnetic members 10, 20, 30 and 40, respectively, are assigned time positions 1, 2, 3 and 4, respectively, coils A′ and B′ are coupled to magnetic member 10 by coupling windings 17 and 18, respectively, coils A and B′ are coupled to magnetic member 20 by coupling windings 27 and 28, respectively, coils A′ and B are coupled to magnetic member 30 by coupling windings 37 and 38, respectively, and coils A and B are coupled to magnetic member 40 by coupling windings 47 and 48, respectively.

Therefore, by means of inhibiting coils A, A′, B and B′ and their associated coupling windings 27 and 47, 17 and 37, 38 and 48 and 18 and 28, respectively, a different combination of one current pulse from each of the alternating pulse pairs is individually coupled to each of the magnetic members in a manner that all of the inhibiting coils and coupling windings of each combination are unenergized at a time position different from all other combinations, the unenergized combination at any time position being coupled to the magnetic member associated with the signal source assigned that time position.

As the sense of the inhibiting coil coupling windings, indicated by straight, diagonal lines forming acute angles to the left, are opposite those of the switching coil coupling windings, indicated by straight, diagonal lines forming acute angles to the right, in the absence of any other energizing pulse, the switching pulse at each time position will reverse the condition of saturation of only member 10 at the first time position, only member 20 at the second time position, only member 30 at the third time position and only member 40 at the fourth time position because only at these respective time positions are all of the inhibiting coils coupled to the respective members unenergized.

In accordance with the assumptions hereinabove set forth, however, only "mark" bits are to appear in the common output circuit 6 as a pulse while "space" bits are to appear in the common output circuit 6 as the absence of a pulse at each time position. Therefore, only the members associated with signal sources which are transmitting "mark" bits must have their condition of saturation reversed at the time position assigned the signal sources associated therewith, thereby producing respective pulses in the common output circuit 6, while members associated with signal sources transmitting "space" bits must not have their condition of saturation reversed at the time position assigned the signal sources associated therewith, thereby producing no pulses in the common output circuit 6.

Coupled to each member is an individual input coil shown at 13, 23, 33 and 43 through associated coupling windings 14, 24, 34 and 44, respectively. As these coupling windings, indicated as straight, diagonal lines forming an acute angle to the left, are in an opposite sense relation to the switching coil coupling windings, the energization of any of these coupling windings by a current of a magnitude sufficinet to produce "B" ampere-turns, FIGURE 1, will shift the operating point of the member to point $H_0$, FIGURE 1, thereby also preventing the switching pulse from reversing the condition of saturation of that member even though both inhibiting coils are unenergized.

Inserted between the signal sources and their respective magnetic members are respective bistable multivibrators shown in block form at 12, 22, 32 and 42 as they are old and well known in the art. These multivibrators are arranged in a manner that, upon the receipt of a "mark" bit from the respective signal source, the left side is conducting, while upon the receipt of a "space" bit from the respective signal source, the right side is conducting. Upon the receipt of a "mark" bit from any of the signal sources, the left side of the associated multivibrator is conducting to the exclusion of the right side, thereby producing no energizing current in the associated individual input coil. A "space" bit from any of the signal sources will render the right side of the associated multivibrator conducting, thereby producing an energizing current in the associated individual input coil. Therefore, as the receipt of a "mark" bit results in no energizing current in the individual input circuit associated therewith, the condition of saturation of the associated member is reversed at its assigned time position through the energization of switching coil 5 thereby producing a pulse in common output circuit 6 at that time position, while a "space" bit produces an energizing current in the associated individual input coil thereby preventing the reversal of the condition of saturation of the member at its assigned time position, resulting in the absence of a pulse in the common output circuit 6 at that time position.

The function of the input multivibrator units, therefore, is to serve as a switch and also to produce a strong energizing current, in the presence of a "space" bit from the associated signal source, throughout all four time positions.

By properly adjusting the ampere-turns produced by each of the energizing currents in relation to each other, the binary bits from a plurality of signal sources may be time position multiplexed in the common output circuit 6 as a pulse or the absence of a pulse at each time position in the device of this invention in the manner as has just been described.

The device of this invention may also be employed for the purpose of demultiplexing the bits of a binary code which have been time position multiplexed, in a manner to be now explained.

When employed as a demultiplexing device, common output coil 6 is not used, the signal sources 11, 21, 31 and 41 and the associated multivibrators 12, 22, 32 and 42, respectively, are not used and switching coil 5 is disconnected from the output of multivibrator 1 and connected to the source of time position multiplexed signals. With this arrangement, therefore, the pulses of the multiplexed signals, which correspond to "mark" bits, serve as switching pulses which energize the switching coil 5 and the demultiplex signals appear in the respective individual circuits 13, 23, 33 and 43, which now serve as individual output circuits, as a pulse, corresponding to a "mark" bit or as the absence of a pulse, corresponding to a "space" bit.

The respective members 10, 20, 30 and 40 are again individually associated with signal sources which have been assigned time positions 1, 2, 3 and 4, respectively. To properly demultiplex the binary signals, therefore, a "mark" bit originating from a signal source assigned time position 1 must appear as a pulse in individual output coil 13, a "mark" bit originating from a signal source assigned time position 2 must appear as a pulse in individual output coil 23, a "mark" bit originating from a signal source from assigned time position 3 must appear as a pulse in individual output coil 33, and a "mark" bit originating from a signal source assigned time position 4 must appear as a pulse in individual output coil 43. "Space" bits, of course, appear as the absence of a pulse in the individual output coils at any time position.

The alternating inhibiting pulse pairs, which are produced in the same manner as has hereinbefore been described, are employed to energize inhibiting coils A, A′, B and B′ and their associated coupling windings 27 and 47, 17 and 37, 38 and 48, and 18 and 28, respectively, in a manner identical to the connections as used when the device is employed as a multiplexer. That is, coils A and B are both energized in the first time position, coils A' and B in the second time position, coils A and B' in the third time position, and coils A' and B' in the fourth time position.

Therefore, by means of coils A, A', B and B' and their associated coupling windings 17 and 37, 27 and 47, 18 and 28, and 38 and 48, respectively, a different combination of one current pulse from each of the alternating pulse pairs is individually coupled to each of the magnetic members in a manner that all of the coupling windings of each combination are thereby energized at a time position different from all other combinations.

As a pulse, corresponding to a "mark" bit, is received at any time position, energizing switching coil 5 and its associated coupling windings 15, 25, 35 and 45, the condition of saturation of only that member associated with the signal source assigned that time position will be reversed at that time position in that it is the only member to which is coupled an unenergized combination of inhibiting coils. The reversal of the condition of saturation of the member will produce an output pulse in the respective individual output coil coupled thereto. As "space" bits are ineffective to reverse the condition of saturation of any member, the receipt of a "space" bit at any time position will result in the absence of a pulse in the respective individual output coils.

In this manner, then, time division multiplexed binary signals appearing in coil 5 are demultiplexed by the device of this invention and appear in individual output coils corresponding to the signal sources from which they originated.

While this device has been described on the basis of one polarity, it is to be understood that all of the respective polarities may be reversed without altering the end result of this device.

While preferred embodiments of this invention have been shown and described, it will be obvious to those skilled in the art that more or less signal sources may be time division multiplexed or demultiplexed by the device of this invention through the use of correspondingly more or less magnetic members, time positions and alternating pulse pairs and that various other modifications and substitutions may be made without departing from the spirit of this invention which is to be limited only within the scope of the appended claims.

What is claimed is:

1. In a time position multiplexing device, a given number of magnetic members each of which is capable of being magnetically saturated in either a first or second condition of saturation, a pulse source for sequentially producing pulses, a pulse counter coupled to said pulse source for cyclically counting the pulses sequentially applied thereto up to a number equal to said given number, said pulse counter producing a signal output manifesting the count registered thereby, means for applying said signal output in cooperative relationship with said magnetic members to maintain all said magnetic members except only a selected one thereof in said first condition of saturation and thereby permit only said selected one of said magnetic members to be switched from one condition of saturation to the other, said selected one of said magnetic members being determined by the count registered by said pulse counter, and means for applying a switching signal in cooperative relationship with said magnetic members tending to switch said magnetic members from said first condition of saturation to said second condition of saturation, whereby only the one of said magnetic members selectively determined by the count registered by said pulse counter at the time said switching signal is applied may be switched to said second condition of saturation.

2. The device defined in claim 1, wherein said pulse counter produces a signal output manifesting in binary code the count registered thereby.

3. The device defined in claim 1, wherein said pulse counter includes a chain of bistable multivibrators each of which produces first and second separate outputs of opposite polarity with respect to a point of reference potential, means for applying pulses from said pulse source as an input to a first of said multivibrators to effect a reversal in the polarity of the outputs thereof in response to each pulse, and means for applying one of the outputs of each of said multivibrators in said chain as an input to the next succeeding multivibrator in said chain to effect a reversal in the polarity of the outputs of the next succeeding multivibrator in the chain in response to a reversal in polarity in a given direction of the applied one of the outputs of the preceding multivibrator in the chain, whereby the combination of polarities appearing on the respective outputs of the multivibrators manifests the count registered thereby, and wherein said means for applying said signal output to said magnetic members includes means for applying each output of each multivibrator to a different combination of predetermined ones of said magnetic members chosen to provide that for each combination of polarities all said magnetic members except a selected one thereof have at least one multivibrator output of a given polarity applied thereto, the application of an output of said given polarity to a magnetic member preventing that magnetic member from being switched from said first to said second condition of saturation in response to the application of a switching signal thereto, and said selected one of said magnetic members differing for each particular combination of polarities.

4. The device defined in claim 1, further including means interconnected to all said magnetic members for inducing a signal therein in response to any of said magnetic members being switched from said first to said second condition of saturation.

5. The device defined in claim 4, further including means responsive to mark-type pulses and space-type pulses applied thereto associated with each of said magnetic members, and means coupling said means responsive to mark and space type pulses to its associated magnetic member to prevent said associated magnetic member in response to only one of said type pulses from being switched to said second condition of saturation by a switching signal applied thereto.

6. The device defined in claim 5, wherein said means responsive to mark and space type pulses applied thereto, is a bistable multivibrator 7. The device defined in claim 6, wherein said switching signal is composed of pulses from said pulse source.

8. The device defined in claim 1, wherein said switching signal is composed of multiplexed pulses each of which occurs isochronously with a pulse from said pulse source.

References Cited in the file of this patent

UNITED STATES PATENTS

| | | |
|---|---|---|
| 2,640,164 | Giel et al. | May 26, 1953 |
| 2,734,182 | Rajchman | Feb. 7, 1956 |
| 2,776,419 | Rajchman et al. | Jan. 1, 1957 |
| 2,816,169 | Pawley | Dec. 10, 1957 |
| 2,928,894 | Rajchman | Mar. 15, 1960 |
| 2,964,737 | Christopherson | Dec. 13, 1960 |